(No Model.)
J. S. GRAHAM.
CHART FOR RAILROAD ROLLING STOCK.
No. 330,577. Patented Nov. 17, 1885.
*Fig. 1.*
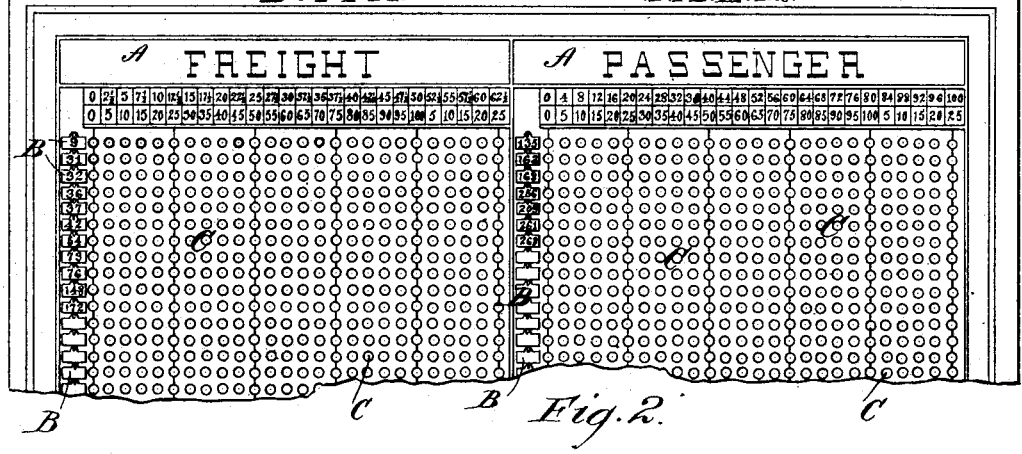
*Fig. 2.*
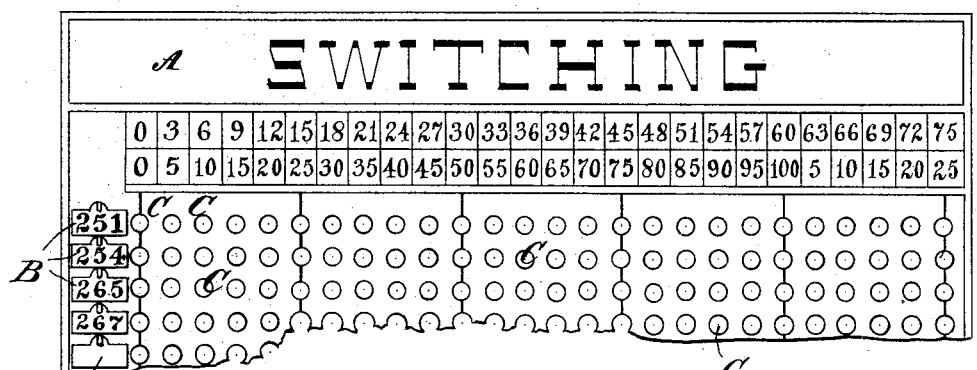
*Fig. 3.*
WITNESSES:
Donn Twitchell.
C. Sedgwick
INVENTOR:
J. S. Graham
BY Munn & Co.
ATTORNEYS.

UNITED STATES PATENT OFFICE.

JOSEPH S. GRAHAM, OF BUFFALO, NEW YORK, ASSIGNOR TO HIMSELF AND GEORGE W. STEVENS, OF CLEVELAND, OHIO.

CHART FOR RAILROAD ROLLING-STOCK.

SPECIFICATION forming part of Letters Patent No. 330,577, dated November 17, 1885.

Application filed February 19, 1885. Serial No. 156,473. (No model.)

*To all whom it may concern:*

Be it known that I, JOSEPH S. GRAHAM, of Buffalo, in the county of Erie and State of New York, have invented a new and Improved Chart for Railroad Rolling-Stock, of which the following is a full, clear, and exact description.

The object of my invention is to provide a new and improved chart for showing the condition of the rolling-stock in relation to repairs of a railroad; and the invention consists in a chart having apertures arranged in vertical and horizontal rows, numbers being produced at the left-hand ends of the horizontal rows, and two numbers, one above the other, being produced above each vertical row.

Reference is to be had to the accompanying drawings, forming part of this specification, in which similar letters of reference indicate corresponding parts in all the figures.

Figure 1 is a chart for passenger and freight locomotives. Fig. 2 is a chart for switching-locomotives. Fig. 3 is a general-average chart.

In the shops of master mechanics, superintendents, &c., of railways it is very desirable to know the number of miles a locomotive has traveled, whereby the time when the locomotive must be brought to the shop and her tires turned can easily be established, and the repairing of other parts, which repairs are not absolutely necessary, can be deferred until the tires are turned. The working, wearing, &c., of the locomotive can also be controlled by means of the chart.

For locomotives I use charts of the three kinds known as "freight," "passenger," and "switching" engine charts. As shown, the freight-locomotives are to travel about fifty thousand miles, switching-engines sixty thousand miles, and passenger-engines eighty thousand miles, before their tires are turned; but these mileages may be varied according to circumstances. On the left-hand edge of each chart A the numbers B of the locomotives are produced in a vertical row, and from each number B a row of apertures, C, extends across the chart, there being twenty-five apertures C in each horizontal row, and thus twenty-five vertical rows of apertures C are formed. The vertical rows are numbered from left to right 5, 10, 15, 20, 25, &c., to 100, and then 5, 10, &c., to 25. The apertures from 0 to 100 of each horizontal row correspond to the time during which a freight-locomotive travels fifty thousand miles—that is, to the mileage of the locomotive—and thus each aperture in each horizontal row corresponds to five per cent. of the mileage—that is, two thousand five hundred miles. The numbers 2½, 5, 7½, 10, 12½ are provided above the numbers 5, 10, 15, 20, &c., and the said numbers 2½, 5, 7½, 10, 12½ express the numbers of thousands of miles the locomotive has traveled. The numbers above 100 represent a percentage of excess mileage. For instance, above the aperture 80 we find 40, and this expresses that the locomotive has traveled forty thousand miles. Pins are placed in the apertures C and gradually shifted toward the right, and by their position show the number of miles traveled by the locomotive having the same number as the horizontal row of apertures in which the pin is held.

The mileage of a passenger-locomotive is eighty thousand miles, which equals four thousand miles for each five per cent., and thus the numbers of thousands rise by fours on the chart for passenger-engines, and the thousands are expressed by the numerals 4, 8, 12, 16, 20, &c., above the percentage-numbers 5, 10, 15, 20, 25, &c.

The mileage of a switching-engine is sixty thousand miles, which equals three thousand miles for each five per cent., and thus the numbers of thousands rise by threes on the chart for switching-engines, and the thousands are expressed by the numerals 3, 6, 9, 12, 15, &c., above the numerals 5, 10, 15, 20, 25, &c. The number of miles traveled is also indicated by means of pins, as described above.

The chart can also be used to register the wear of a locomotive-tire. For instance, if the tires are to wear off three-eighths of an inch between each turning off of the tires and any tire has been worn off three-sixteenths of an inch, the pin of a passenger-locomotive should be at the aperture C below the number 50—that is, the locomotive should have traveled forty thousand miles. If the pin shows more than fifty per cent., the tire is more durable than the average; if less than fifty per per cent., the tire is below the average.

The above-described charts show at a glance how many thousand miles a locomotive may run before it must be sent to the shops, and thus the running of locomotives can be fully controlled, and the master mechanic can at all times make provision to have a sufficient number of locomotives in good condition on hand to replace those that have been sent to the shops.

The average of the locomotives of each class is shown on an average-chart, E, (shown in Fig. 3,) which has nine horizontal rows of apertures F, which also form nine vertical rows. The vertical and horizontal rows are numbered from 0 to 9, and the general average of all the locomotives of the road can be shown on the general-average chart. To express a certain number, a pin is placed in the aperture which is on the vertical row expressed by the right-hand digit, and the horizontal row expressed by the left-hand digit. For instance, if the general average of a certain class of locomotives is 47, the pin is placed in that aperture F which is on the horizontal row 4, and on the vertical row 7. The general average of all the locomotives of a division is also expressed in a general-average chart constructed in the manner described. The locomotive-numbers B on the chart A can be produced on detachable slips, cards, or slides.

The charts are preferably made of wood, but may as well be made of other material—such as pasteboard, sheet metal, &c.

The above-described charts can be used for other rolling-stock as well as for locomotives.

It is evident that the same kind of chart can be used where the mileage of a locomotive is more or less than I have described it.

Having thus described my invention, what I claim as new, and desire to secure by Letters Patent, is—

1. A chart having a row of numbers representing locomotives, cars, or other rolling-stock, a row of apertures for each rolling-stock number or name, and two rows of numerals adjacent to or above the uppermost row of apertures, the numerals of one of the said rows of numerals expressing the percentage of the mileage and the numerals of the other row expressing the number of miles or thousands of miles traversed for each percentage-numeral, substantially as herein shown and described.

2. A chart having the horizontal row of apertures C, also forming vertical rows, the numbers B at the left-hand ends of the horizontal rows, and two numbers, one above the other, at the top of each vertical row, substantially as herein shown and described, in combination with an average-chart, E, which consists of nine horizontal rows of apertures, F, which also form nine vertical rows, the said vertical and horizontal rows being numbered from 0 to 9, all as and for the purpose specified.

JOSEPH S. GRAHAM.

Witnesses:
JAMES D. TILLINGHAST,
WM. JOHNSON.